Sept. 5, 1967 J. B. HALL 3,339,968
VEHICLE LOADING RAMP
Filed Sept. 29, 1966 2 Sheets-Sheet 1

INVENTOR.
JOHN B. HALL
BY
ATTORNEYS

Sept. 5, 1967  J. B. HALL  3,339,968
VEHICLE LOADING RAMP

Filed Sept. 29, 1966  2 Sheets-Sheet 2

INVENTOR.
JOHN B. HALL
BY *Price & Henevold*
ATTORNEYS

United States Patent Office 3,339,968
Patented Sept. 5, 1967

3,339,968
VEHICLE LOADING RAMP
John B. Hall, 3136 Crane Creek Road,
Boise, Idaho 83702
Filed Sept. 29, 1966, Ser. No. 582,951
14 Claims. (Cl. 296—61)

This invention relates to loading ramps and, more particularly, to loading ramps particularly adapted for utilization in combination with a vehicle having a hingedly mounted tail gate adapted to swing from a closed upright position downwardly about an axis adjacent the edge of the floor thereof.

The loading and unloading of bulky or heavy objects from a vehicle for purposes of delivery to the consumer or use at another location by the owner presents many seemingly insurmountable problems. Frequently, the weight and size of the object is sufficiently great that at least two persons are required to lift it to the bed of the transferring vehicle and, on many occasions, manual loading is completely impossible. Even if a sufficient number of men are provided for anticipated loading and unloading operations, the constant threat of injury to one or all of them renders accurate work force planning nearly impossible. For the commercial concern, substitute workmen must be kept available with a consequent increase in overhead. For the individual, scheduling must be arranged such that assistance will be available at the loading or unloading site. The undesirability of these factors is evident.

In the past, many types of devices have been proposed to alleviate these problems. Such devices include, for example, lift trucks, hoists attached directly to the rear of the moving vehicle and, on occasion, different types of loading ramps adapted to form an inclined surface from the ground to the floor of the moving vehicle over which the goods may be moved. The former types of devices are, of course, extremely expensive to purchase and are not justified unless a high volume of heavy merchandise is being moved by a particular vehicle. Certainly, the occasional mover or the small businessman whose product is not extremely heavy and/or bulky cannot afford the capital investment which this type of equipment requires.

The ramp types of loading devices which have been proposed have also failed to furnish an adequate solution for the problem. If they were fabricated with sufficient structural qualities to withstand heavy loads, they were prohibitively expensive to the majority of consumers, as well as being difficult to manipulate at the loading site. If, on the other hand, the price and weight of the product was kept at a relatively low level, great limitations were placed upon its load bearing capabilities and, thus, its over-all effectiveness. Additional problems such as storage of the ramp when not in use, its effect upon the utility of the particular vehicle for other purposes, installation costs, safety considerations and ease of manipulation have rendered their usage not feasible for the majority of vehicle owners who, therefore, must continue to lift and lower goods to and from their vehicles by hand.

It is an object of this invention to provide a loading ramp which is not subject to the disadvantages outlined above.

More particularly, it is an object of this invention to provide a loading ramp which possesses excellent structural characteristics and, yet, which may be fabricated sufficiently inexpensively to be marketed at a price within the reach of the majority of interested purchasers.

It is an object of this invention to provide a device of the type described which, when not in use, may be quickly and easily removed from the vehicle and which does not require an appreciable amount of storage space when not in use.

It is an object of this invention to provide a loading ramp which may be retained on the vehicle even though not necessitated at the particular time without marked degradation in the utility of the vehicle.

It is an object of this invention to provide a loading ramp which may be moved easily into and out of loading position by a single person and, yet, which possesses sufficient structural rigidity to handle heavy loads.

It is an object of this invention to provide a device of the type described which retains its functional characteristics regardless of inclement weather.

It is another object of this invention to provide a device of the type described which is capable of serving as a load space extension as well as a loading and unloading ramp.

It is an object of this invention to provide a device of the type described particularly adapted for utilization in conjunction with a vehicle having a swinging tail or side gate wherein the ramp loads are transferred directly to the chassis of the vehicle via the tail gate hinge.

It is yet another object of this invention to provide a loading ramp which is separable from the standpoint that it may be transferred from vehicle to vehicle in a matter of a few minutes after installation of relatively inexpensive components on each of the vehicles.

It is an object of this invention to provide a loading ramp which may be attached to vehicles of varying makes having tail gates of varying widths without requiring the utilization of separate attachment components.

These, as well as other objects of this invention, will be readily understood by reference to the following specification and accompanying figures in which.

Figure 1:
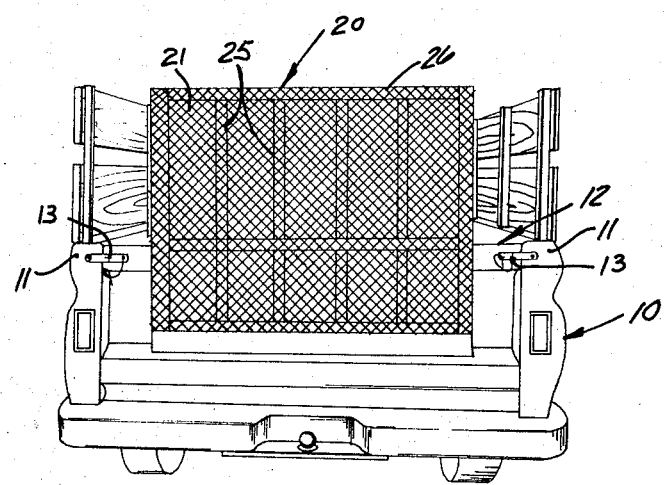
FIG. 1 is a rear-elevational view of a vehicle having the loading ramp which is the subject of this invention affixed thereto in retracted position.

Briefly, this invention comprises first and second ramp panels pivotally affixed to one another along adjacent edges thereof. Means are provided for limiting the pivotal movement of the panels with respect to one another when they have been pivoted to an extended position wherein their upper surfaces form a continuous, generally planar ramp surface.

Means are provided for affixing the first ramp section in overlapping relationship with respect to one surface of the hingedly mounted tail gate of a conventional vehicle. The first or upper ramp is positively affixed to the tail gate for movement therewith as the tail gate is pivoted about its hinged mounting. When the tail gate is lowered toward its open position, the ramp sections are pivoted to their extended position such that the opposite edge of the second section abuts the surface on which the vehicle is positioned to form an inclined ramp from the surface to the floor of the vehicle.

Referring now to FIGS. 1 through 8, a preferred embodiment of this invention will be described in detail. A conventional pickup truck 10 having sides 11, a floor 14, a tail gate assembly 12 hingedly affixed adjacent the floor at 15 and a conventional set for retaining chains 13 for maintaining the tail gate in upright or horizontal position has the ramp assembly 20 affixed thereto. The ramp assembly comprises an upper panel 21 and a lower panel 22 which are hinged together along adjacent edges thereof by means of a series of truss-type hinge leafs 23 pivotally pinned by conventional pins 24. The construction and positioning of hinge leafs 23 is such that when the panels 21 and 22 are unfolded from the retracted storage position illustrated in FIG. 1 to the extended position illustrated in FIG. 2, the adjacent edges 29 of the panels abut one another and limit further pivotal movement about pins 24 to form a continuous planar ramp from the two hingedly connected sections.

Figure 4:
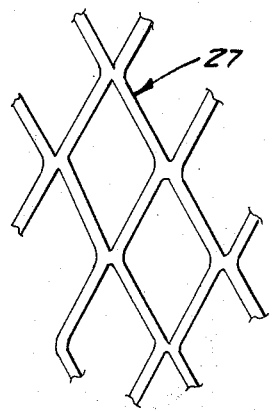
FIG. 4 is a fragmentary, side-elevational view of the expanded metal grating.

Each of the panels 21 and 22 is fabricated from a plurality of longitudinal bracing members 25, a plurality of lateral bracing members 26 and a load bearing grate 27 (see FIG. 4). Grate 27 is preferably cut from commercially available expanded metal stock to provide a slip free surface and, also, to prevent blocking of the drivers rearward vision during travel. Each of the panels is preferably formed by welding the bracing members in fixed relationship to one another and then welding the grating to the bracing members at multiple points of contact within the outer boundaries as well as on the periphery of the panel. In this manner, maximum structural rigidity may be obtained. The size of the bracing, which may conveniently be tubular steel and angle steel, and the weight of the grate will depend, of course, on the particular loads which are to be supported. The lower tail gate abutting surface of upper panel 21 is provided with a tongue extension 28, the purpose of which will become apparent hereinafter.

Figure 2:
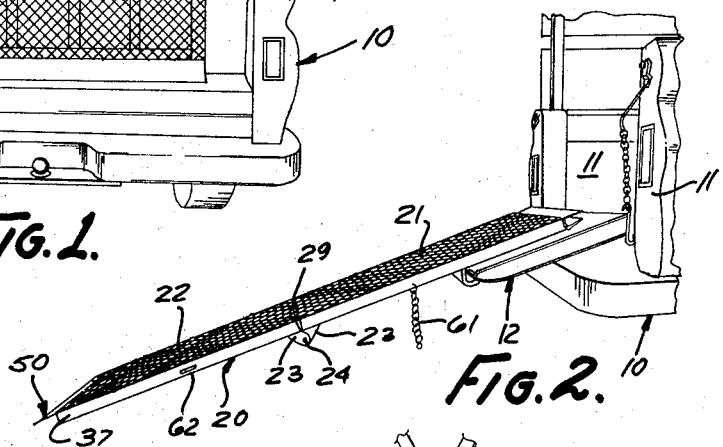
FIG. 2 is a fragmentary, perspective view of a vehicle having the loading ramp extended into loading or unloading position.
Figure 3:
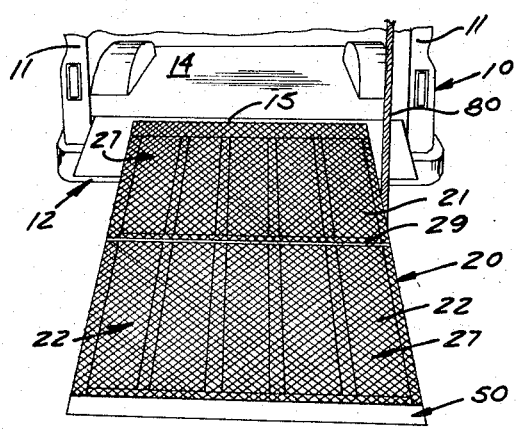
FIG. 3 is a fragmentary, rearward perspective view of the loading ramp attached to the vehicle in extended position.
Figure 6:
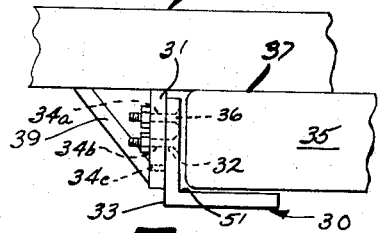
FIG. 6 is a fragmentary, side-elevational view of the adjustable hooking or clamping structure which fits over the upper edge of the tail gate.

Referring now particularly to FIGS. 2 and 6, the ramp 20 is provided with an elongated hooked-shaped assembly 30 adapted to engage upper section 35 of the tail gate 12. Assembly 30 comprises an elongated depending flange 31 depending from and affixed to the lower surface of upper panel 21 and a mating angle member 33. Flange 31 may be braced by means of plate 39 if necessary. Flange 31 and angle 33 have a plurality of mating apertures, 34 and 32 respectively, drilled therein. Ordinarily, two such sets of apertures on either end of depending flange 33 are sufficient. Suitable countersunk fastening means 36 are inserted from the tail gate abutting surface of angle 33 through the apertures 32 and 34 and the entire assembly is affixed together by suitable nuts.

It will be noted that flange 31 is provided with more apertures 34 than there are fastening means 36. This allows the assembly 30 to be adjusted so as to accommodate tail gates of varying thicknesses without the necessity of providing separate components depending upon the type of vehicle on which the ramp is to be used. If, for example, the ramp is to be affixed to a vehicle having a relatively thin tail gate, the fasteners 36 will be passed through apertures 34a and 34b on the flange 33. If, on the other hand, the ramp is to be affixed to a vehicle having a relatively thick tail gate, apertures 34b and 34c will be utilized.

Figure 7:
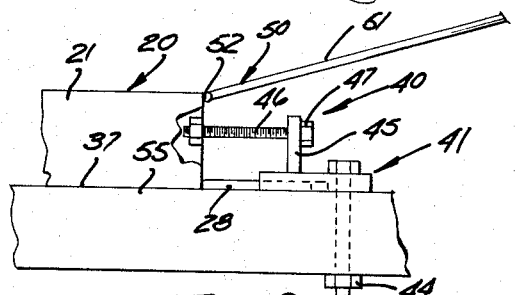
FIG. 7 is a fragmentary, side-elevational view of the attachment structure.
Figure 8:
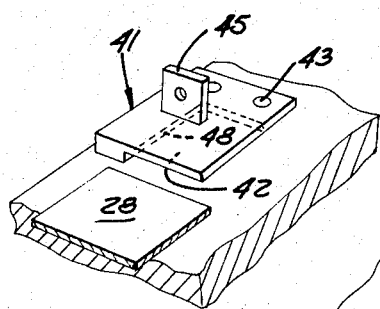
FIG. 8 is a broken, exploded, fragmentary perspective view illustrating the manner in which the tongue extension is slidably received by the encasement plates.
Figure 8:
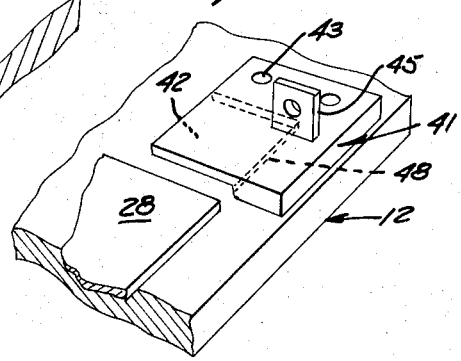

Referring now particularly to FIGS. 7 and 8, the details of the ramp retaining assembly 40 will be described. A pair of encasement plates 41, each having rectangular open faced recesses 42, are affixed to the interior tail gate by means of suitable fasteners 44 passed through apertures 43 such that the recessed section 42 faces the interior surface of the tail gate. Encasement plates 41 are positioned such that the space between walls 48 thereof slidably accommodates the tongue extension 28 which is affixed directly to the upper panel 21. Preferably, tongue extension 28 terminates laterally short of the edges of the panels such that the encasement plates 41 do not protrude beyond these lines.

Encasement plates 41 each have one or more upstanding lugs 45 affixed thereon. The upper panel assembly is retained in position by means of a pair of draw bolts 46 passed through suitable apertures on the interior of the upper lateral bracing member 26 of the upper panel, through a suitable aperture in the lug 45 and secured by any conventional means which may be welded directly to the upper panel assembly. Bolts 46 function merely to retain hooking assembly 30 in engagement with tail gate section 35. They do not carry any appreciable amount of the ramp load and, thus, they need not be fabricated from extremely heavy material.

The entire retaining assembly 40 may be covered by means of an approach plate assembly 50 having a plate 51 hingedly mounted as at 52 to the upper edge of ramp panel 21. The plate may be swung downwardly to provide a relatively smooth approach from the floor to the ramp and may be swung upwardly when it is desired to remove or adjust draw bolts 46. Conveniently, a similar approach plate may be provided at the lower extremity of panel 22 to provide a sloped approach to the ramp from the surface upon which the vehicle is resting.

When the ramp is in the position shown in FIG. 1, relative pivotal displacement of the panels 21 and 22 is prevented by means of securing assemblies 60 which comprises a pair of chains 61 affixed to upper ramp 21 and a pair of hook members 62 affixed to lower panel 22. As shown best in FIG. 5, the chains are merely passed over the hooks to prevent swinging of the rearward ramp when it is in the retracted or storage position shown in FIG. 1.

Assume that the ramp 20 is in the traveling position indicated in FIG. 1. The perforate nature of the mesh grating enables the driver of the pickup to use the inside-the-cab rear view mirror despite the presence of the ramp, while he is traveling to the loading and/or unloading site. Upon arrival, the chains or latches 13 which maintain the tail gate 12 in its upright closed position are released and the chains 61 are removed from their hooks 62. By grasping the bottom of the lower panel 22 and pulling it away from the cab of the vehicle, the ramp may be swung to the extended position shown in FIG. 2. The panels 21 and 22 pivot relatively about hinge leafs 23 and, at the same time, the tail gate 12 pivots downwardly about its hinge 15. The abutment of sides 29, which are in compression, and the connection of the associated hinge leafs 23, which are in tension, maintain the ramp panels in the planar disposition shown in FIG. 2.

As a load is rolled or driven onto the ramp, tail gate 12 tends to pivot about its hinge 15 in a counterclockwise direction as viewed in FIG. 2. Such rotation is prevented, however, by the bearing of the upper lower edge 55 of panel 21 against tail gate 12, the bearing of the upper section 35 of tail gate 12 against the face 54 of angle 33. The retaining assembly 40 bears little, if any, stress during the loading or unloading operation and, thus, there is no danger of breaking encasement plates 41 which, preferably, fit somewhat loosely to allow attachment of the ramp with relative ease.

When the particular loading and/or unloading operation has been completed, the ramp may be raised from the position shown in FIG. 2 to the position shown in FIG. 1 by merely grasping and lifting it either from the lower extremity or from the area of the hinge leafs 23. When the ramp has been raised to its vertical position, chains 13 are locked to secure the tail gate in its closed position and, securing assembly 60 is activated by placing chains 61 over hooks 62 to prevent rocking of the lower panel section 22 during travel. In this position, the panel is vertically stabilized by the encasement plates 41 and the hooking assembly 30.

Depending upon the weight of the particular ramp, it may be desirable to utilize a tension spring 80 suitably affixed to the side 11 and the upper ramp panel 21 to assist in the lowering and raising of the ramp. Such a system, of course, reduces the weight which the operator must handle during the extending and retracting of the ramp and, thus, increases the ease of manipulation thereof.

Should it be desired to remove the loading ramp 20 from the pickup 10, it is necessary only to loosen the nuts or fasteners 47 from drawbolts 46 and slide the ramp away from the encasement plates 41 such that hook assembly 30 disengages tail gate section 35. The hooking assembly 30, while snug enough to prevent undesirable shaking, will slide from engagement with the tail gate with relative ease to permit removal of the ramp therefrom. The vehicle may be used thereafter for other purposes without hinderance from the previous attachment of the ramp 20, since only the encasement plates 41 remain attached thereto.

Reattachment may be made by merely sliding the tongue extension 28 into the rectangular recesses 42 and resecuring draw bolts 46. The construction of encasement plates 41 is such that the bearing of the tongue extension edges against the walls 48 prevents lateral movement with respect to the tail gate during travel.

After removal of the ramp assembly 20 from the vehicle 10, it may be quickly attached to another vehicle on which an extra set of encasement plates 21 has already been installed or, alternatively, it may be stored by merely setting it in an upright position against a wall or the like. This folded configuration requires little storage space.

Figure 5:
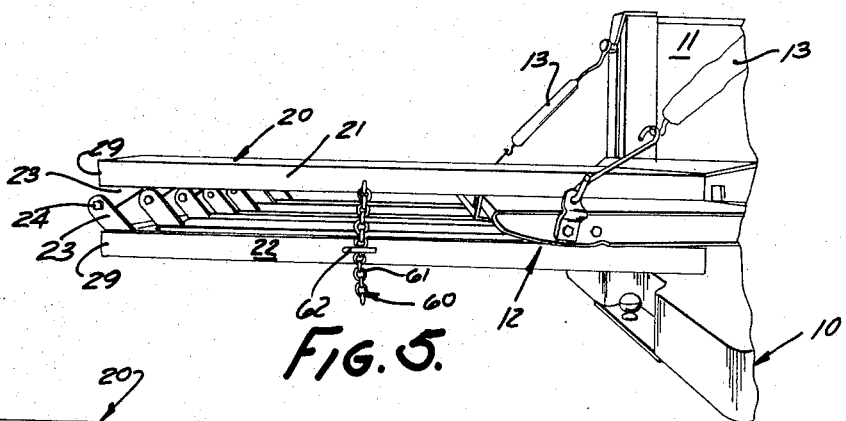
FIG. 5 is a fragmentary, perspective view of a vehicle having the loading ramp attached thereto wherein the loading ramp is being utilized as a space extension for the vehicle.

In the event that it is desired to transport objects which are relatively lengthy in relation to the length of floor 14, the tail gate may be lowered without disconnecting securing assemblies 60 and retained in a horizontal position by means of chains 13. In this particular case, as shown in FIG. 5, chains 61 prevent the pivotal separation of panels 21 and 22 and the extended length of panel 21 may be utilized as an integral load bearing surface within the vehicle cargo area.

Figure 9:
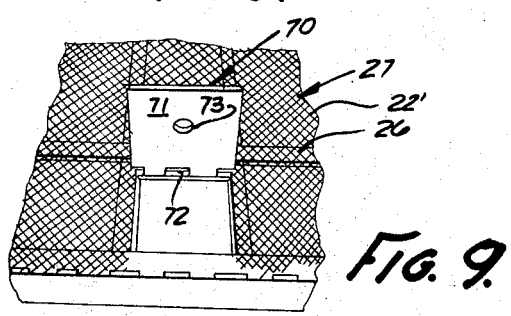
FIG. 9 is a fragmentary perspective view of a modified ramp.

In the event that a vehicle is utilized which has a center tail gate unlatching handle, the modified ramp illustrated in FIG. 9 is utilized. This ramp is identical to that previously described with the exception that an access assembly 70, consisting of a plate 71 hingedly affixed to the grating 27 or the lateral bracing 26 at 72 and having an aperture 73 therein, replaces a section of the grate 27 on lower panel 22' of ramp 20'. The plate 71 is of sufficient size to overlap the grating and, thus, no danger exists of its swinging downwardly when borne upon by a load. In order to gain access to the tail gate latching assembly, it is necessary only to grasp plate 21 by means of apertures 73 and swing it upwardly.

The ramp assembly which has been described may be fabricated relatively inexpensively and the resultant product is relatively light in weight. The latter factor is, of course, extremely important insofar as manipulation and use of the system is concerned. Merely by way of example, one and one-half inch angles may be utilized for the longitudinal braces 25, one inch by one and one-half inch by 0.065 inch steel tubing for the lateral braces 26, and three-fourths #10 expanded metal for the grate 27. A ramp having two three by four foot sections so constructed will weigh approximately 110 pounds and have a conservative 1,500 pound load capacity.

While a preferred embodiment of this invention has been described in detail, along with a minor modification thereof, it will be readily apparent to those skilled in the art that differing embodiments may be fabricated without a departure from the spirit of this specification and the accompanying drawings. Such differing embodiments are to be deemed as encompassed within the scope of the following claims unless these claims, by their language, expressly state otherwise.

I claim:

1. In a vehicle having a cargo carrying box with a floor, two sides and a hingedly mounted gate adapted to swing from a closed, upright position downwardly about an axis adjacent the edge of said floor to an open position to permit access to said box, the combination comprising:

first and second ramp panels pivotally affixed to one another proximate adjacent edges thereof;

stop means for limiting the pivotal movement of said panels with respect to one another when they have been pivoted from a retracted position with their lower surfaces lying generally adjacent to an extended position wherein the upper surfaces of said panels form a continuous, generally planar ramp surface; and means affixing said first ramp panel in overlapping relationship with respect to the interior surface of said gate for positive movement therewith whereby, when said gate is lowered toward said open position and said ramp panels are pivoted to said extended position, the opposite edge of said second panel will abut the ground on which said vehicle is positioned to form an inclined ramp from said ground to said floor.

2. The combination as set forth in claim 1 wherein said panels are of approximately the same length, so that said gate is sandwiched between the lower surfaces of said first and second panels when said gate is closed.

3. The combination as set forth in claim 2 which further comprises means selectively retaining said first and second panels in sandwiched relationship with respect to said gate whereby said first panel may be utilized as an extension of said floor by affixing said gate in approximately horizontal position.

4. The combination as set forth in claim 2 wherein said panels each comprise a plurality of longitudinal and lateral bracing members having a perforate member affixed thereover whereby said ramp does not interrupt the vision of an operator when said tail gate is in closed position.

5. The combination as set forth in claim 2 wherein said affixing means comprises:

hooking means affixed to said first panel adapted to hook around the upper section of said tail gate; and means for securing said first section in hooked relationship with respect to said tail gate.

6. The combination as set forth in claim 5 wherein said hooking means comprises a bearing plate having its surface positioned generally parallel to the lower surface of said first panel, said upper section of said gate adapted to fit between said first panel lower surface and said bearing plate whereby, when said ramp is in said extended position and loaded, said upper section of said tail gate will bear against said bearing plate.

7. The combination as set forth in claim 6 wherein the spacing between said bearing plate and the lower surface of said first section is adjustable whereby gates of varying thicknesses may be accommodated.

8. The combination as set forth in claim 5 wherein said securing means comprises:

means for laterally positioning said first section with respect to said tail gate; and means for drawing said first section toward the hinge mounting of said tail gate.

9. The combination as set forth in claim 8 wherein said positioning means comprises:

an extension lip affixed to the forward opposite edge of said first panel, said lip abutting the interior surface of said gate when said ramp is affixed thereto;

plate means affixed to said tail gate having recesses adapted to slidably receive said tongue extension, said drawing means bearing between said plate means and said first section whereby said ramp may be disconnected from said tail gate by releasing said drawing means, leaving only said plate means affixed to said tail gate.

10. The combination as set forth in claim 9 which further comprises an approach plate hingedly affixed to said first section adapted to cover said securing means subsequent to attachment of said ramp to said tail gate.

11. The combination as set forth in claim 1 which further comprises tension spring means connected between said box and said first section for biasing said first section into an upright retracted position.

12. The combination as set forth in claim 2 wherein said panels are pivotally affixed by means of a plurality of hinge leafs depending downwardly from the lower surface of said panels and converging toward each other and wherein said pivotal movement limiting occurs when said adjacent edges abut one another.

13. A loading ramp comprising:
first and second rectangular ramp panels pivotally affixed to one another along adjacent edges thereof;
stop means for limiting the relative pivotal movement of said panels when they have been pivoted from a folded position with their lower surfaces lying generally adjacent to an extended position wherein the upper surfaces of said panels form a continuous, generally planar ramp surface;
a bearing plate affixed to and spaced from the lower surface of said first panel intermittent the extremities thereof to form a hooking member having its opening oriented generally toward the opposite edge of said first panel and adapted to hook over the upper section of a vehicle tail gate; and
means for affixing the said opposite edge to said vehicle tail gate.

14. The apparatus as set forth in claim 13 wherein said panels each comprise a plurality of longitudinal and lateral bracing members having a perforate member affixed thereover whereby said ramp does not interrupt the vision of an operator when said tail gate is in closed position and furnishes a relatively skid free working surface when in extended position.

References Cited
UNITED STATES PATENTS

| | | | |
|---|---|---|---|
| 684,125 | 10/1901 | Strader | 296—61 |
| 2,559,712 | 7/1951 | Dobbs | 214—85 |
| 2,727,781 | 12/1955 | D'Eatn | 296—61 |

BENJAMIN HERSH, *Primary Examiner.*

JAMES H. BRANNEN, *Assistant Examiner.*